July 17, 1956     J. R. MARTIN     2,755,328
BATTERIES
Filed July 29, 1952     2 Sheets-Sheet 1
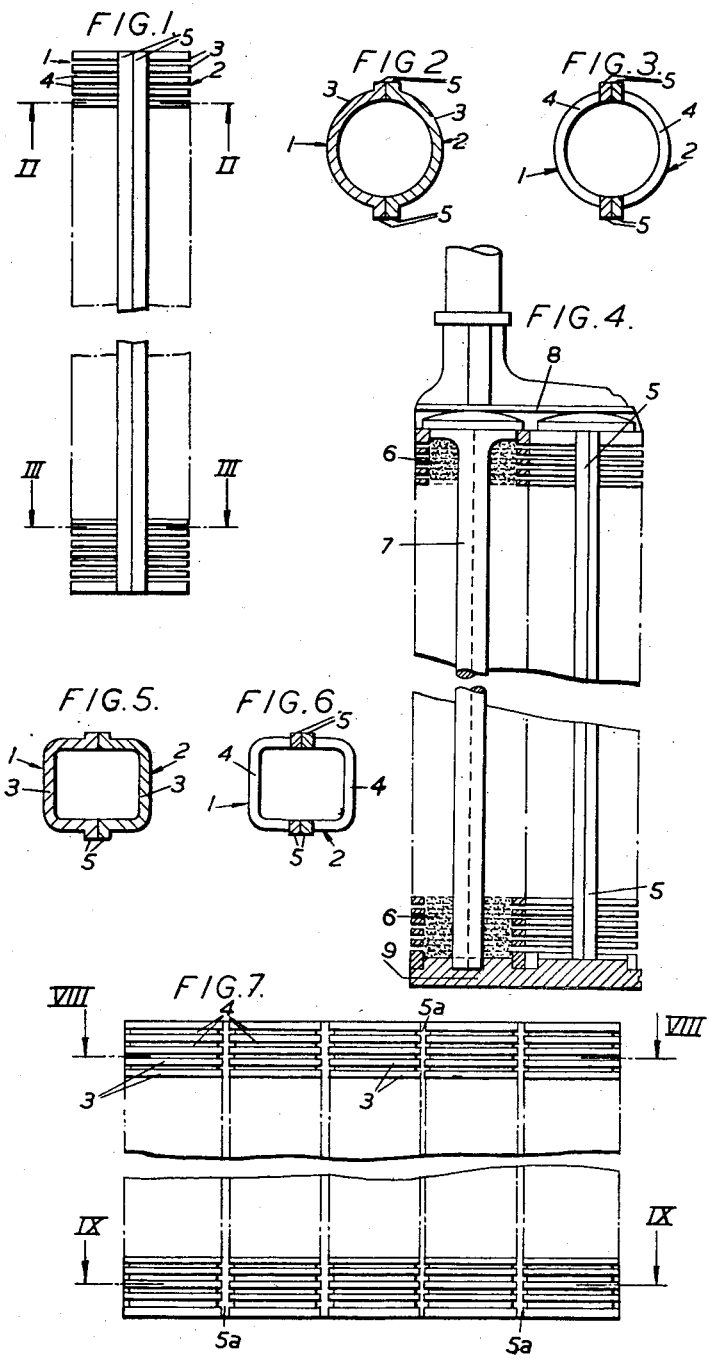

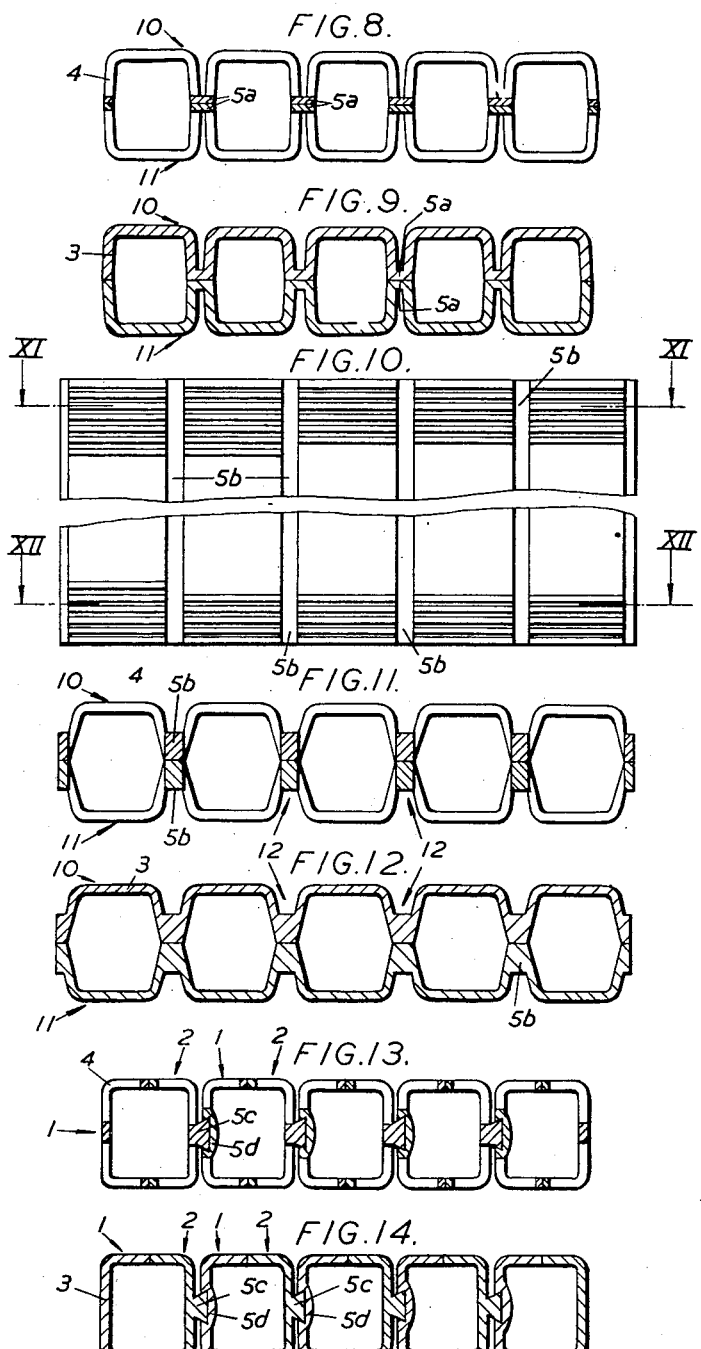

United States Patent Office 2,755,328
Patented July 17, 1956

2,755,328

BATTERIES

John Ronald Martin, Denton, near Manchester, England, assignor to Oldham & Son Limited, Denton, near Manchester, England, a British company Application July 29, 1952, Serial No. 301,463

1 Claim. (Cl. 136—43)

This invention relates to batteries or accumulators and, in particular, to an improved method of manufacturing tubular-type positive plates for use with lead-acid batteries or accumulators.

Heretofore it has been proposed to manufacture tubular-type positive plates for use with lead-acid batteries in which the plates comprise an assembly of five separate ebonite tubes of circular cross-section. In this prior proposal each tube is transversely slotted in a manner such that the slots are not continuous around the tube but are arranged as substantially aligned pairs, the slots of a pair being on opposite sides of the tube. The tubes contain the active material of the positive plate and are arranged to retain this material in a manner such that it is not shed through the slots under conditions of rough usage. The purpose of the slots is to provide means whereby electro-chemical action between said active material and the electrolyte in the battery may proceed in an unhindered manner. It is important in such plates that the surface area occupied by the transverse slots be as large as possible compatible with good mechanical strength and the adequate protection of the active material within the tube. Each positive tube is provided with an axially disposed lead spine which makes electrical connection with the active material in the tube and the ends of the lead spine are joined to connecting bars, one of the connecting bars being arranged for electrical connection with the positive post of the battery.

In the manufacture of tubes of the kind described above the transverse slots are formed by means of a circular saw, it being necessary to form the slots first on one side of the tube, then to reverse the tube so that the slots may be formed on the opposite side thereof and it is found to be difficult to maintain precise manufacturing tolerances and to keep the slots free from swarf.

It is a main object of the present invention to provide a tubular-type positive plate for use in a lead-acid battery, which plate can be produced more uniformly and more economically than plates of the kind discussed above.

According to the present invention, there is provided for a tubular type positive plate for use with a lead-acid battery or accumulator, a tube for containing the active material comprising two channel-sections cemented together along the longitudinal edges thereof, each said section being moulded from a plastic material which is resistant to sulphuric acid and having parallel ribs spaced apart to define slots exposing the active material retained by the ribs to the electrolyte, the ribs extending transversely to the length of the section and the slots extending to the length of the section and the slots extending to positions adjacent said longitudinal edges, the slots of one section being aligned with the slots of the other section.

Further according to the present invention there is provided for use in a lead-acid battery or accumulator, a tubular-type positive plate comprising a plurality of integral tubes for containing the active material arranged in side by side relation, the tubes being formed by two plate-sections each moulded from a plastic material which is resistant to sulphuric acid and consisting of a plurality of channel-sections spaced apart by flanges extending laterally from the longitudinal edges of the channels, each channel-section having parallel ribs spaced apart to define slots exposing the active material retained by the electrolyte, the ribs extending transversely to the length of the channel-section and the slots extending to positions adjacent the longitudinal edges of the channel-section, the two plate-sections being cemented together along said longitudinal edges with the slots of one plate-section aligned with the slots of the other plate-section.

In order that the invention may be clearly understood some embodiments thereof will now be described, by way of example, with reference to the accompanying diagrammatic drawings, in which:

Fig. 1 is a broken elevation of a tube according to the invention,

Figs. 2 and 3 are respectively sections on lines II—II and III—III, Fig. 1,

Fig. 4 is an elevation, partly in section, of a portion of a positive plate formed by tubes according to the invention, Figs. 5 and 6 are sections similar to those of Figs. 2 and 3 but illustrate a tube of substantially rectilinear cross-section, Fig. 7 is a broken elevation of a plurality of integral tubes formed from plate-sections, Figs. 8 and 9 are respectively sections on lines VIII—VIII and IX—IX, Fig. 7, Fig. 10 is a broken elevation of a plurality of integral tubes formed from plate-sections of a kind modified from that shown in Fig. 7, Figs. 11 and 12 are respectively sections on lines XI—XI and XII—XII, Fig. 10, and, Figs. 13 and 14 are sections of a modified embodiment of the invention and illustrate a mode of connecting individual tubes in side-by-side relation to form a plate.

Referring to Figs. 1 to 6, a tube for a tubular-type positive plate for use with a lead-acid battery is formed from two semi-circular half-tube sections 1, 2, the two half-tube sections being formed from plastic material which is resistant to sulphuric acid. One form of plastic material which has been found suitable for carrying the invention into effect is polystyrene and the two half-tube sections for the tube are formed in moulds by known injection moulding processes. The moulds are so formed that each of the two half-tube sections 1, 2 comprises a series of semi-circular parallel ribs 3 spaced apart to form slots 4 therebetween of arcuate form, the spacing of the ribs 3 being such that the slots formed therebetween occupy a surface area which is as large as possible compatible with the tube sections having adequate mechanical strength and, when the two half-tube sections are cemented together, being adequate to retain active battery material within the tube. Flanges 5 are provided along the two longitudinal edges of each of the sections and when the sections are removed from the mould they are placed together with the flanges in abutting relation and the slots in the two half-tube sections in substantial alignment, and the flanges are then cemented together. In the example just described, the tube formed is of substantially cylindrical cross-section, but it will be understood that, if desired, the cross-section of the tube may be substantially rectilinear as illustrated in Figs. 5 and 6.

To form a tubular-type positive plate from tubes of the kind just described a plurality of tubes, for example, five tubes, are filled in the usual manner, as illustrated in Fig. 4, in which figure two tubes of a set of five are shown, with positive active material 6 and a lead spine 7 is inserted into the tube to be surrounded by the active material. The ends of the lead spines are connected by relatively light connecting links to make electrical connection therebetween. If desired, however, as illustrated in Fig. 4, a connecting link 8 may be provided only at the tops of the spines, the lower ends of the spines being located in circular recesses which may be formed in the tube or in a plug 9 which is cemented into the lower end thereof.

In an alternative embodiment of the invention, shown in Figs. 7 to 9, a plurality of tube sections may be moulded as an integral plate section 10, 11 in which half-tube sections are arranged side by side in spaced relation, the half-tube sections being provided with flanges 5a integral with adjacent half-tube sections so that a plurality of half-tube sections, for example five sections, are integral one with the other to form a plate section as aforesaid. In this embodiment of the invention, two plate sections are aligned as described above and the flanges 5a thereof are cemented together whereafter the tubes are filled and the lead spines connected as described above.

If desired, as shown in Figs. 10 to 12, when forming plate sections the flanges may be formed as strips 5b extending lengthwise of the half-tube sections, the strips by being integral therewith being arranged to connect two adjacent half-tube sections. Such connecting flanges will then be cemented together as above described and the section of the flanges is such that there is provided between the outer surface thereof and the backs of the tube-sections grooves or recesses 12, for example of flat-bottomed V-section, to accommodate a stripper bar for effecting ejection of the moulded plate section from its mould.

In a further embodiment of the invention, as shown in Figs. 13 and 14, the individual tubes may be formed as described above, but the tubes may be provided with means integral therewith whereby they can be retained in side by side relation to form a plate. To this end the flanges for each section are so arranged that on one side of the half section, a flange portion 5c extends outwards therefrom and on the other side a flange portion 5d extends inwards thereof. The flange portions 5c are arranged to form male dove-tail members for assembly with recesses formed in the flange portions 5d.

In this embodiment of the invention the tubes are formed individually from half-tube sections as described above and when the half-tube sections have been cemented together to form the tubes a positive plate is formed by so assembling the tubes that the dove-tailed flanged portion 5c of one tube is inserted lengthwise into the female portion 5d of a second tube, the number of tubes so assembled determining the size of the plate. If desired, as shown in Figs. 13 and 14 the tubes which are to comprise the two outer tubes of a plate are so formed that one of such tubes has only a male flange, while the other is provided only with a female flange.

In each of the embodiments described above location of the two sections, whether they be individual half-tube sections or half-plate sections may be effected by locating pegs and corresponding recesses, the pegs being formed in one half section and the recesses in the other. By the provision of such dowelling means quick and precise assembly and cementing of the sections is facilitated.

I claim:

In a tubular-type positive plate construction for use with a lead-acid battery, a pair of tube-forming sections arranged in abutting relationship to define a series of enclosures for containing an active material, each of the said tube-forming sections including a plurality of slotted bodies, means consisting of a plurality of reinforcing portions for connecting the slotted bodies of the respective sections one to another along adjacent edges thereof, said reinforcing portions being constructed and arranged to define external slots of predetermined width and depth between adjacent slotted bodies of each of the tube-forming sections, each of said reinforcing portions being further formed with internal flat bonding surfaces, the reinforcing portions consisting of separate strips of material interposed between adjacent slotted bodies.

References Cited in the file of this patent

UNITED STATES PATENTS

| | | |
|---|---|---|
| 490,753 | Osburn | Jan. 31, 1893 |
| 1,218,329 | Smith et al. | Mar. 6, 1917 |
| 1,243,371 | Willard | Oct. 16, 1917 |
| 1,506,561 | Burton | Mar. 27, 1923 |
| 2,404,158 | Ambruster | July 16, 1946 |

FOREIGN PATENTS

| | | |
|---|---|---|
| 570,055 | Great Britain | June 20, 1945 |